United States Patent
Jun

(10) Patent No.: US 12,183,305 B2
(45) Date of Patent: Dec. 31, 2024

(54) DISPLAY APPARATUS AND TIMING CONTROLLER THEREOF

(71) Applicant: LX Semicon Co., Ltd., Daejeon (KR)

(72) Inventor: Young Jun Jun, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 168 days.

(21) Appl. No.: 17/964,390

(22) Filed: Oct. 12, 2022

(65) Prior Publication Data

US 2023/0114963 A1  Apr. 13, 2023

(30) Foreign Application Priority Data

Oct. 12, 2021 (KR) .................. 10-2021-0135243
Oct. 11, 2022 (KR) .................. 10-2022-0129394

(51) Int. Cl.
  *G06T 15/00* (2011.01)
  *G06T 7/60* (2017.01)
  *G06V 10/50* (2022.01)
  *G06V 10/56* (2022.01)
  *G09G 5/06* (2006.01)

(52) U.S. Cl.
  CPC .............. *G09G 5/06* (2013.01); *G06T 7/60* (2013.01); *G06V 10/507* (2022.01); *G06V 10/56* (2022.01); *G06T 2207/10024* (2013.01); *G09G 2320/0626* (2013.01); *G09G 2320/0666* (2013.01); *G09G 2340/06* (2013.01)

(58) Field of Classification Search
  CPC ........ G06V 10/56; G06V 10/507; G06T 7/60; G06T 2207/10024; G09G 2360/16; G09G 2320/0271; G09G 2320/0626; G09G 2320/0223; G09G 2320/0666; G09G 2340/06; G09G 3/3208; G09G 5/06
  USPC ........................................... 345/418
  See application file for complete search history.

(56) References Cited

U.S. PATENT DOCUMENTS

| | | | | |
|---|---|---|---|---|
| 9,472,146 | B2 * | 10/2016 | Yang | G09G 3/3611 |
| 9,773,455 | B2 * | 9/2017 | Chung | G09G 3/3225 |
| 10,818,234 | B2 * | 10/2020 | Song | G09G 3/3233 |
| 10,964,278 | B2 * | 3/2021 | Yabuki | G09G 3/3648 |
| 11,935,488 | B2 * | 3/2024 | Pyun | G09G 3/3275 |
| 11,984,087 | B2 * | 5/2024 | Nam | G09G 3/3426 |
| 2017/0270841 | A1 * | 9/2017 | An | G09G 5/005 |
| 2021/0020098 | A1 * | 1/2021 | Yum | G09G 3/3208 |

* cited by examiner

*Primary Examiner* — Phu K Nguyen
(74) *Attorney, Agent, or Firm* — POLSINELLI PC

(57) ABSTRACT

A display apparatus and a timing controller thereof is disclosed. The timing controller detects a size of an image by using image data, generates first output image data according to the size of the image, and generates second output image data by using the first output image data. The second output image data is generated according to a saturation value of the first output image data.

18 Claims, 8 Drawing Sheets

DISPLAY APPARATUS AND TIMING CONTROLLER THEREOF

BACKGROUND

1. Technical Field

Various embodiments generally relate to a display apparatus, and more particularly, to a display apparatus and a timing controller thereof, capable of compensating for a voltage drop.

2. Related Art

In general, a display apparatus includes a display panel, the display panel includes a plurality of pixels which are arranged in a matrix form. The display apparatus includes a thin film transistor (TFT) for switching a voltage to be applied to each of the plurality of pixels and a light emitting element which converts an electrical signal into light. The display apparatus displays an image by controlling the luminance of the light emitting element according to given luminance information. The light emitting element included in each pixel emits light of any one of the three primary colors of red, green and blue, and allows a desired color to be recognized by a spatial or temporal sum of the primary colors.

Such a conventional display panel of the display apparatus includes a plurality of power lines to which a driving voltage is applied are formed. In the pixels of the display panel, a voltage drop may occur due to various reasons. The voltage drop means that a data voltage of a level lower than a voltage level corresponding to image data is applied. Therefore, the display panel has difficulty in displaying an image with uniform brightness.

For example, in the case of an organic light emitting display device, the voltage drop of the pixels may be changed according to the number of pixels emitting light on the display panel, and the voltage applied to the display panel may be changed. As a result, the brightness of the display panel may be changed. Accordingly, the brightness of the white image in which the largest number of pixels are turned on may be lowered.

In addition, when the size of the image displayed on the screen of the display panel is changed, the voltage drop may also be changed. For example, as the image is smaller, the difference in brightness of the white expressed as the sum of brightness values of red, green, and blue may be larger due to the voltage drop.

Therefore, there is a need to develop a technology capable of solving a change in the brightness of the white according to the size of the image displayed on the screen.

SUMMARY

Various embodiments are directed to a display apparatus and a timing controller thereof, capable of compensating for a voltage drop (an IR-drop) of an OLED pixel that varies depending on the size of the image displayed on the screen.

Also, various embodiments are directed to a display apparatus and a timing controller thereof, capable of compensating for a voltage drop depending on the size of the image displayed on the screen so that the sum of brightness values of red, green, and blue maintains the brightness value of white even when the number of pixels emitting light changes.

Further, various embodiments are directed to a display apparatus and a timing controller thereof, capable of compensating for a voltage drop (IR-Drop) of an OLED pixel so that the brightness value of the white, which is the sum of the brightness values of red, green, and blue, can be maintained even when the size of the image displayed on the screen changes.

In an embodiment, a display apparatus may comprise a timing controller converting image data inputted from an external into output image data, wherein the timing controller configured to: generating an on-pixel ratio information corresponding to a size of image on a screen by using the image data; selecting a first weight approximating the on-pixel ratio information in a lookup table having weights for compensation according to the size of the image on the screen; generating a second weight corresponding to the on-pixel ratio information by converting the first weight; converting the image data into first output image data by using the second weight; converting the first output image data into second output image data by controlling a degree to which the second weight is applied to a saturation value corresponding to the first output image data according to a saturation weight corresponding to the first output image data; and outputting the second output image data as the output image data.

In an embodiment, a timing controller may comprise an on-pixel ratio generator configured to receive image data inputted from an external and generating an on-pixel ratio information corresponding to a size of image on a screen by using the image data; a storage configured to store a lookup table having weights for compensation according to the size of the image on the screen; a weight generator configured to receive the first weight approximating the on-pixel ratio information among the weights of the lookup table and generate a second weight corresponding to the on-pixel ratio information by converting the first weight; a first image data generator configured to convert the image data into first output image data by using the second weight; and a second image data generator configured to convert the first output image data into second output image data by controlling a degree to which the second weight is applied to a saturation value corresponding to the first output image data according to a saturation weight corresponding to the first output image data, and output the second output image data as an output image data.

Accordingly, the display apparatus and the timing controller according to the embodiment has an effect of compensating for a voltage drop occurring in a display panel that varies depend on the size of the image displayed on the screen. Also, the display apparatus and the timing controller according to the embodiment has an effect capable of compensating for a voltage drop depending on the size of the image displayed on the screen so that the sum of brightness values of red, green, and blue maintains the brightness value of white even when the number of pixels emitting light changes. Further, the display apparatus and the timing controller according to the embodiment has an effect capable of compensating for a voltage drop (IR-Drop) of an OLED pixel so that the brightness value of the white, which is the sum of the brightness values of red, green, and blue, can be maintained even when the size of the image displayed on the screen changes.

DETAILED DESCRIPTION

Hereinafter, a display apparatus in accordance with an embodiment will be described with reference to FIG. 1.

Figure 1:
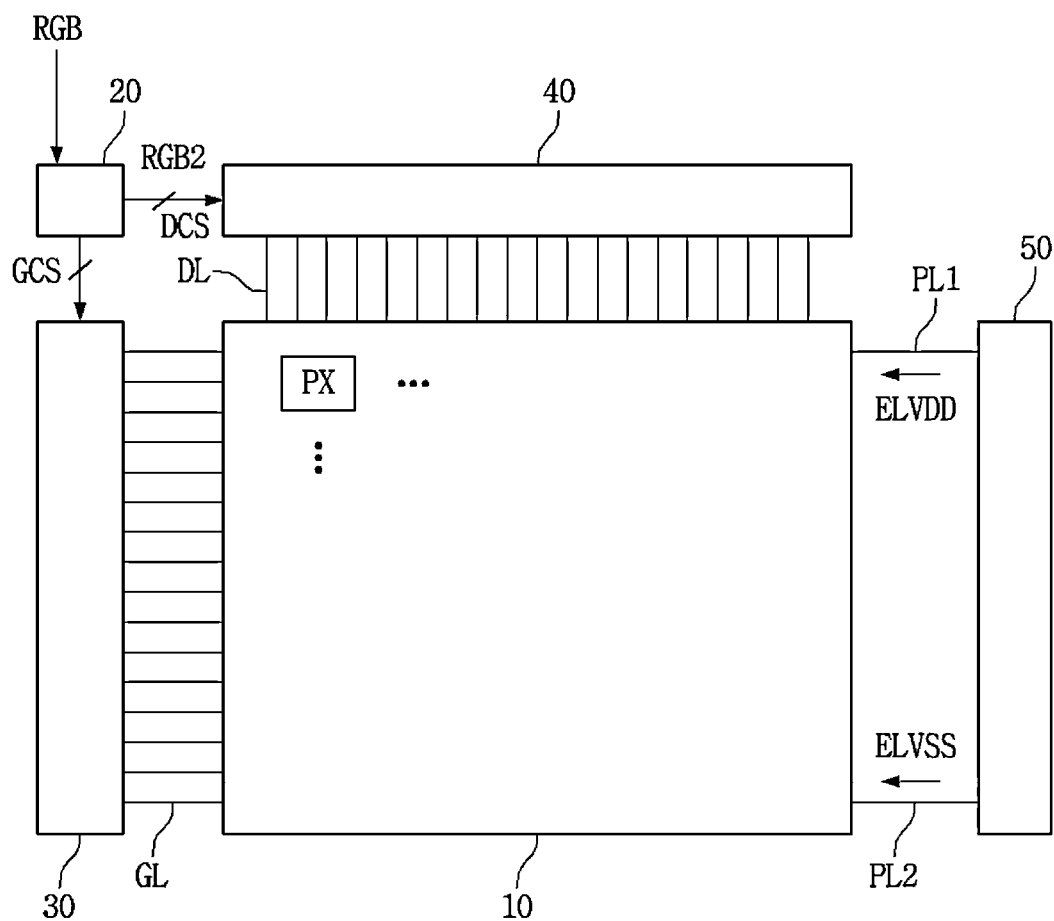
FIG. 1 is a block diagram illustrating the configuration of a display apparatus in accordance with an embodiment.

FIG. 1 is a block diagram illustrating the configuration of a display apparatus in accordance with an embodiment.

Referring to FIG. 1, a display apparatus 1 may include a display panel 10, a timing controller 20, a gate driver 30, a data driver 40, and a power supply 50. The timing controller 20, the data driver 40 and the gate driver 30 may be configured in the form of independent integrated circuits, and at least two devices may be configured in the form of one integrated circuit. However, it is to be noted that the embodiment is not limited thereto.

The display panel 10 may include a plurality of pixels PX. Each of the plurality of pixels PX may be an organic light emitting diode (OLED). Each of the plurality of pixels PX may receive to driving voltages ELVDD and ELVSS and emit with luminance controlled by a data voltage. Each of the plurality of pixels PX may emit light with an undesired luminance due to a voltage drop. Each of the plurality of pixels PX may include a red sub-pixel (R), a green sub-pixel (G) and a blue sub-pixel (B). The brightness of the display panel 10 may be controlled according to a DBV (display brightness value). The brightness of the display panel 10 and the plurality of pixels PX will be described later.

The timing controller 20 may provide a synchronization signal and/or a control signal to the data driver 40, the gate driver 30 and the power supply 50. The timing controller 20 may control the supply timing of a scan signal and the supply timing of the data voltage by using the synchronization signal and/or the control signal. The synchronization signal and/or the control signal may include a plurality of gate control signals GCS for controlling the gate driver 30 and a plurality of data control signals DCS for controlling the data driver 40.

The timing controller 20 may receive image data RGB from the outside, for example, a host device (not illustrated). The timing controller 20 may calculate an on-pixel ratio of pixels PX which emit light among the plurality of pixels PX, by using the image data RGB. The on-pixel ratio may be understood as a ratio of pixel PX that emit light to display an image among a plurality of pixels PX forming a screen. That is, it may be understood that the on ration corresponds to the size of the image on the screen. The timing controller 20 may detect the size of an image to be displayed on the screen, by using the on-pixel ratio. The timing controller 20 may include a lookup table (LUT) saving a first weight WT1 which is for compensating a voltage drop according to the image size. The first weight WT1 may be understood to have a preset value corresponding to the specific on ratio. The timing controller 20 may calculate a second weight WT2 corresponding to the size of the image by the first weight WT1 of the lookup table according to the size of an image. The timing controller 20 may generate first output image data RGB1 by applying the second weight WT2 to the image data RGB. The second weight WT2 may be understood to have a value converting the first weight WT1 to suit the size of the image and reflect a weight related to the size of the image in the first weight WT1.

The timing controller 20 may generate a saturation weight Sa corresponding to the first output image data RGB1. The timing controller 20 may convert the first output image data RGB1 of RGB color space to first converted image data Y1CbCr of YCbCr color space. The timing controller 20 may generate second saturation value Y2 by applying the second weight WT2 and the saturation weight Sa to first saturation value Y1 of the first converted image data Y1CbCr. For example, the timing controller 20 may generate the second saturation value Y2 so that the sum of the luminances of the red sub-pixels (R), the luminances of the green sub-pixels (G) and the luminances of the blue sub-pixels (B) is the same as the luminance of a white (W). The timing controller 20 may convert the second converted image data Y2CbCr of the YCbCr color space including the second saturation value Y2 to the second output image data RGB2. Accordingly, the timing controller 20 may compensate for a voltage drop according to the size of the image by providing the data driver with the second output image data RGB2 compensated to maintain uniform brightness regardless of the size of the image to be displayed the screen. The detailed configuration of the timing controller 20 will be described later.

The gate driver 30 may apply the scan signal to a corresponding pixel PX among the plurality of pixels PX through the plurality of gate lines GL according to the synchronization signal and/or the control signal. A specific line may be selected in the display panel 10 according to the scan signal, and the data voltage supplied from the data driver 40 may be supplied to the pixel PX of the selected line.

The data driver 40 may receive the second output image data RGB2. The data driver 40 may generate an data voltage corresponding to the second output image data RGB2, according to the synchronization signal and/or the control signal. The data driver 40 may apply the data voltage to a corresponding pixel PX among the plurality of pixels PX through the plurality of data lines DL.

The power supply 50 may convert external power, and thereby, may generate a first driving voltage ELVDD and a second driving voltage ELVSS. The power supply 50 may supply the first driving voltage ELVDD to the display panel 10 through a first power line PL1, and may supply the second driving voltage ELVSS to the display panel 10 through a second power line PL2.

Figure 2:
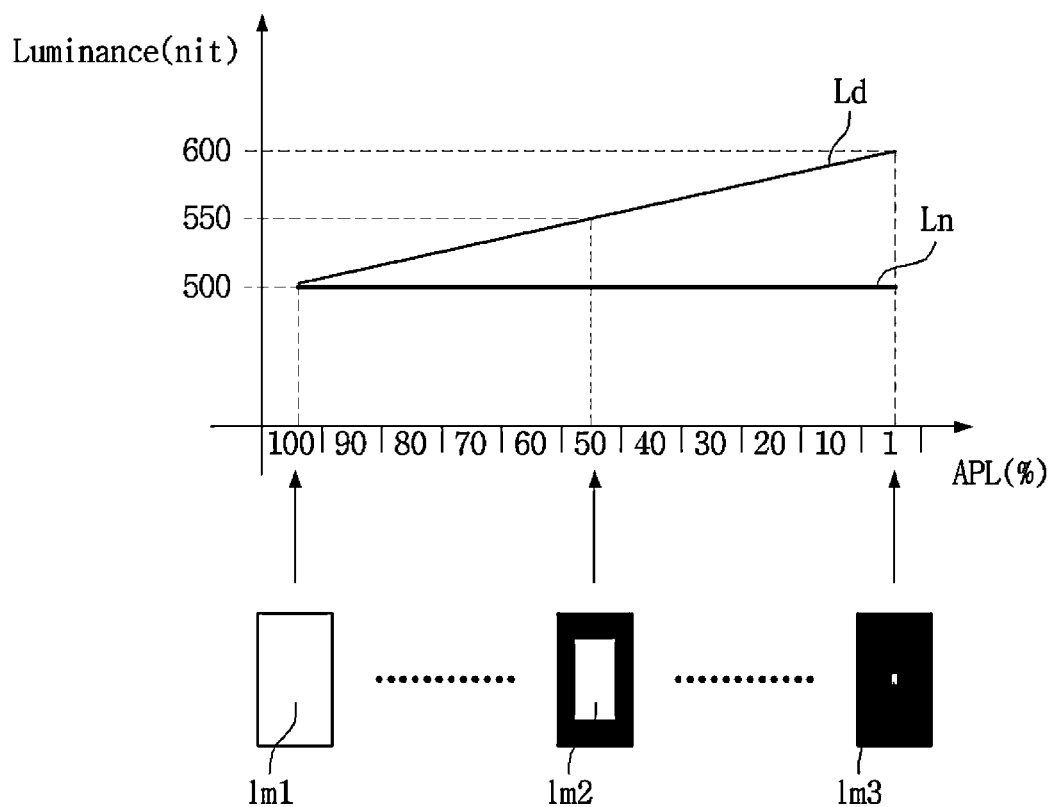
FIG. 2 is a graph illustrating the relationship between an average picture level (APL) and the luminance of a pixel depending on the size of an image displayed on a display panel in accordance with an embodiment.

FIG. 2 is a graph illustrating the relationship between an average picture level (APL) and the luminance of the image depending on the size of an image displayed on a display panel in accordance with an embodiment.

Based on an 8-bit image, an average picture level (APL) of the image to be displayed on the display panel 10 may have a grayscale of 0 to 255 levels. For example, when 25% pixels PX among the plurality of pixels PX of the entire display panel 10 display a maximum white grayscale of the 255 level and the remaining pixels display a black grayscale of the 0 level, an average picture level is 25%. However, when the pixels of an entire screen display the maximum white grayscale of the 255 level, the average picture level is 100%.

When a voltage drop does not occur, if a grayscale value is the same, a luminance is constant regardless of the size of an image to be displayed. However, when a voltage drop occurs, the magnitude of the voltage drop is proportional to the size of an image to be displayed. That is to say, as the size of an image to be displayed is large, the driving voltages ELVDD and ELVSS decrease and driving currents corresponding to the driving voltages ELVDD and ELVSS also decrease. Even when a data voltage corresponding to the same grayscale value is supplied to the pixel PX, a high driving voltage is supplied in inverse proportion to the size of an image to be displayed according to the influence of a voltage drop. In other words, even if a grayscale value is the same, the size and luminance of an image to be displayed are inversely proportional due to the influence of a voltage drop. Therefore, an increase in the luminance of a small image deteriorates image quality, and accelerates degradation of the organic light emitting diode.

For example, in FIG. 2, referring to a luminance graph Ln when no voltage drop occurs, a luminance is constant as 500 nits regardless of the size of an image to be displayed. Namely, the luminances of a largest first image Im1, a medium-sized second image Im2 and a smallest third image Im3 are all the same as 500 nits. However, referring to a luminance graph Ld when a voltage drop occurs, the luminance of the first image Im1 is 500 nits, the luminance of the second image Im2 is 550 nits, and the luminance of the third image Im3 is 600 nits. Thus, the size and luminance of an image to be displayed are inversely proportional due to the influence of a voltage drop.

As shown in FIG. 2, an on-pixel ratio of pixels PX is proportional to the average picture level of an image to be displayed. For example, in the first image Im1, the pixels of an entire screen display the maximum white grayscale of the 255 level. The average picture level of the first image Im1 is 100%. In the second image Im2, 50% pixels of the plurality of pixels PX display the maximum white grayscale of the 255 level and the remaining pixels display the black grayscale of the 0 level. The average picture level of the second image Im2 is 50%. In the third image Im3, 1% pixels of the plurality of pixels PX display the maximum white grayscale of the 255 level and the remaining pixels display the black grayscale of the 0 level. The average picture level of the third image Im3 is 1%.

Therefore, by calculating an on-pixel ratio and adjusting an image data voltage according to the calculated on-pixel ratio, the luminance of a pixel may be controlled. For example, the grayscale value of image data may be controlled in proportion to the on-pixel ratio. That is to say, as the size of an image to be displayed is small and thus an on-pixel ratio decreases, a grayscale value of image data may be lowered so as to control the luminance of a pixel to an appropriate value.

Hereinafter, the timing controller 20 in accordance with the embodiment will be described in detail with reference to FIG. 3.

Figure 3:
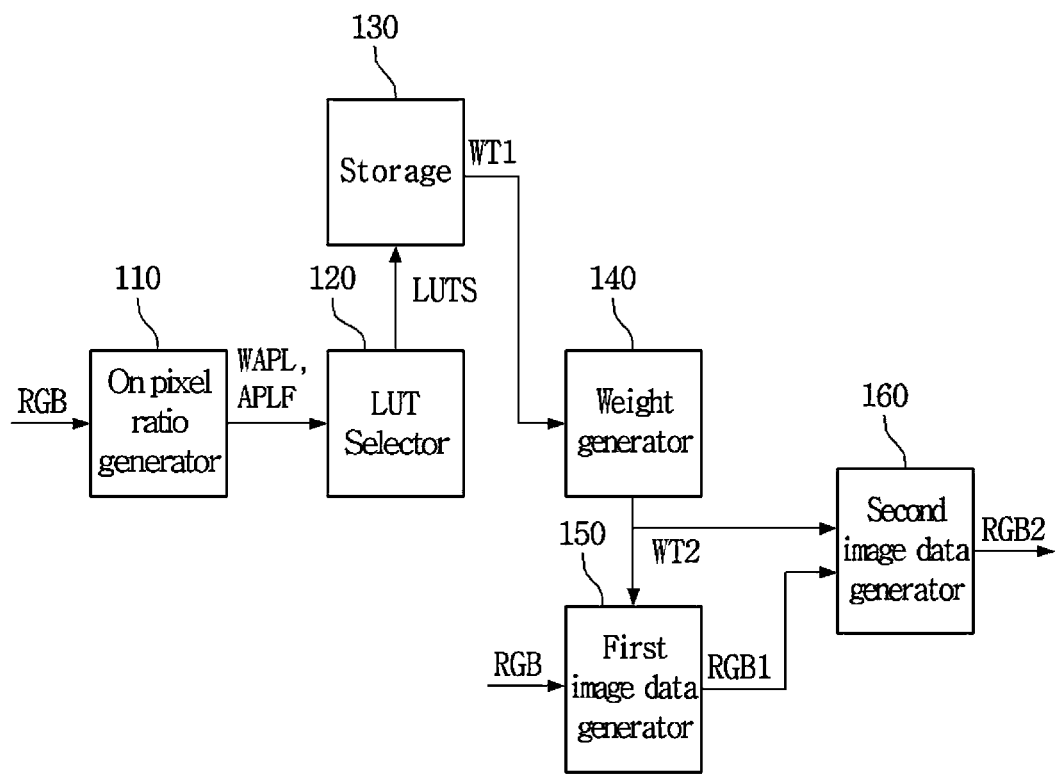
FIG. 3 is a block diagram illustrating the configuration of a timing controller in accordance with an embodiment.

FIG. 3 is a block diagram illustrating the configuration of a timing controller.

Referring to FIG. 3, the timing controller 20 may include an on-pixel ratio generator 110, an LUT selector 120, a storage 130, a weight generator 140, a first image data generator 150, and a second image data generator 160.

In a first mode and a second mode, the on-pixel ratio generator 110 may generate an on-pixel ratio information. The on-pixel ratio information may include an average picture level APL and a weighted average picture level WAPL, as be described later.

In the first mode, the on-pixel ratio generator 110 may generate the average picture level APL, the weighted average picture level WAPL, a first on-pixel ratio maximum value MOPR1, and a second on-pixel ratio maximum value MOPR2 for the full screen. The average picture level APL may be an average value of the grayscale values of a plurality of pixels corresponding to an image to be displayed on the display panel 10 among the plurality of pixels PX. The weighted average picture level WAPL may be calculated by using a maximum value among sums of a plurality of grayscale values of a plurality of pixels PX corresponding to an image to be displayed and a maximum value among sums of square values of the plurality of grayscale values of the plurality of pixels PX.

The first on-pixel ratio maximum value MOPR1 may be a maximum value among the grayscale values of the red sub-pixels (R), the grayscale values of the green sub-pixels (G) and the grayscale values of the blue sub-pixels (B). The second on-pixel ratio maximum value MOPR2 may be a value that is obtained by dividing, by the resolution of the display panel 10, a maximum value among the square values of the grayscale values of the red sub-pixels (R), the square values of the grayscale values of the green sub-pixels (G) and the square values of the grayscale values of the blue sub-pixels (B). The on-pixel ratio generator 110 may generate the average picture level APL and the weighted average picture level WAPL as the on-pixel ratio determining the size of the image on the screen in the first mode and a second mode. A detailed method for the on-pixel ratio generator 110 to generate the on-pixel ratio information determining the size of the image will be described later.

Hereinafter, a detailed method in which the on-pixel ratio generator 110 generate the average picture level APL, the weighted average picture level WAPL, the first on-pixel ratio maximum value MOPR1 and the second on-pixel ratio maximum value MOPR2 in the first mode will be described.

The on-pixel ratio generator 110 may generate the average picture level APL for the full screen by using the image data RGB. The on-pixel ratio generator 110 may generate the average picture level APL by weighted averaging the grayscale values of the red sub-pixels (R), the grayscale values of the green sub-pixels (G) and the grayscale values of the blue sub-pixels (B). The on-pixel ratio generator 110 may generate the average picture level APL by using Equation 1 below.

$$APL=avg(Y), Y=a*R+b*G+c*B \qquad \text{[Equation 1]}$$

In Equation 1, R is the grayscale value of the red sub-pixel (R), G is the grayscale value of the green sub-pixel (G), and B is the grayscale value of the blue sub-pixel (B). Also, a is a weight for the grayscale value of the red sub-pixel (R) (e.g., a=0.299), b is a weight for the grayscale value of the green sub-pixel (G) (e.g., b=0.587), c is a weight for the grayscale value of the blue sub-pixel (B) (e.g., c=0.144), and a, b and c may have the relationship of a+b+c=1.

The on-pixel ratio generator 110 may generate the first on-pixel ratio maximum value MOPR1 with a largest value among the average grayscale value of red sub-pixels (R), the average grayscale value of green sub-pixels (G) and the average grayscale value of blue sub-pixels (B). The on-pixel ratio generator 110 may generate the first on-pixel ratio maximum value MOPR1 by using Equation 2 below.

$$\text{MOPR1} = \text{MAX}(\text{avg}(R), \text{avg}(G), \text{avg}(B)) \quad \text{[Equation 2]}$$

In Equation 2, avg(R) is the average grayscale value of the red sub-pixels (R), avg(G) is the average grayscale value of the green sub-pixels (G), and avg(B) is the average grayscale value of the blue sub-pixels (B).

The on-pixel ratio generator 110 may generate the second on-pixel ratio maximum value MOPR2 by dividing a maximum value among square values of the grayscale average values of the respective three sub-pixels by the number of data bits and the resolution of the display panel 10. The on-pixel ratio generator 110 may generate the second on-pixel ratio maximum value MOPR2 by using Equation 3 below.

$$\text{MOPR2} = [\text{MAX}(\text{avg}(R^2), \text{avg}(G^2), \text{avg}(B^2))/2^M]/\text{Resolution} \quad \text{[Equation 3]}$$

In Equation 3, avg($R^2$) is the square of the average grayscale value of the red sub-pixels (R), avg($G^2$) is the square of the average grayscale value of the green sub-pixels (G), and avg($B^2$) is the square of the average grayscale value of the blue sub-pixels (B). M is the number of bits of data indicating a grayscale value (e.g., 8), and Resolution is the resolution of the display panel 10.

The on-pixel ratio generator 110 may generate the weighted average picture level WAPL by using, as a factor, a quadratic expression of the grayscale values of the plurality of pixels PX corresponding to an image to be displayed or the grayscale values of the three sub-pixels (R, G and B). For example, the weighted average picture level WAPL may be generated by dividing a second maximum value by a first maximum value. The first maximum value is a maximum value among a first square sum value obtained by summing the squares of the grayscale values of the red sub-pixels (R), a second square sum value obtained by summing the squares of the grayscale values of the green sub-pixels (G) and a third square sum value obtained by summing the squares of the grayscale values of the blue sub-pixels (B). The second maximum value is a maximum value among a first sum value obtained by summing the grayscale values of the red sub-pixels (R), a second sum value obtained by summing the grayscale values of the green sub-pixels (G) and a third sum value obtained by summing the grayscale values of the blue sub-pixels (B). The on-pixel ratio generator 110 may generate the weighted average picture level WAPL by using Equation 4 below.

$$\text{WAPL} = \text{MAX}(\text{sum}(R^2), \text{sum}(G^2), \text{sum}(B^2))/\text{MAX}(\text{sum}(R), \text{sum}(G), \text{sum}(B)) \quad \text{[Equation 4]}$$

In Equation 4, sum($R^2$) is the first square sum value obtained by summing the squares of the grayscale values of the red sub-pixels (R), sum($G^2$) is the second square sum value obtained by summing the squares of the grayscale values of the green sub-pixels (G), and sum($B^2$) is the third square sum value obtained by summing the squares of the grayscale values of the blue sub-pixels (B). sum(R) is the first sum value obtained by summing the grayscale values of the red sub-pixels (R), sum(G) is the second sum value obtained by summing the grayscale values of the green sub-pixels (G), and sum(B) is the third sum value obtained by summing the grayscale values of the blue sub-pixels (B).

In the second mode, the on-pixel ratio generator 110 may generate the average picture level APL of each sub-pixel by using the image data RGB. Namely, the on-pixel ratio generator 110 may generate the average picture level of the red sub-pixels (R), the average picture level of the green sub-pixels (G) and the average picture level of the blue sub-pixels (B). The on-pixel ratio generator 110 may generate the on-pixel ratio of the red sub-pixels (R), the on-pixel ratio of the green sub-pixels (G) and the on-pixel ratio of the blue sub-pixels (B), respectively. The on-pixel ratio generator 110 may generate the weighted picture level of the red sub-pixels (R), the weighted picture level of the green sub-pixels (G) and the weighted picture level of the blue sub-pixels (B), respectively.

Hereinafter, a method in which the on-pixel ratio generator 110 calculates the average picture level, the on-pixel ratio and the weighted average picture level of each sub-pixels in the second mode will be described.

The on-pixel ratio generator 110 may generate an average picture level APL_R of the red sub-pixels (R), an average picture level APL_G of the green sub-pixels (G) and an average picture level APL_B of the blue sub-pixels (B) by using Equation 5 below.

$$\text{APL\_R} = \text{avg}(R), \text{APL\_G} = \text{avg}(G), \text{APL\_B} = \text{avg}(B) \quad \text{[Equation 5]}$$

In Equation 5, avg(R) is the average grayscale value of the red sub-pixels (R), avg(G) is the average grayscale value of the green sub-pixels (G), and avg(B) is the average grayscale value of the blue sub-pixels (B).

The on-pixel ratio generator 110 may generate the on-pixel ratio OPR_R of the red sub-pixels (R), the on-pixel ratio OPR_G of the green sub-pixels (G), and the on-pixel ratio OPR_B of the blue sub-pixels (B) by using Equation 6 below.

$$\text{OPR\_R} = [\text{sum}(R^2)/2^M]/\text{Resolution}, \text{OPR\_G} = [\text{sum}(G^2)/2^M]/\text{Resolution}, \text{OPR\_B} = [\text{sum}(B^2)/2^M]/\text{Resolution} \quad \text{[Equation 6]}$$

In Equation 6, sum($R^2$) is the sum of the squares of the grayscale values of the red sub-pixels (R), sum($G^2$) is the sum of the squares of the grayscale values of the green sub-pixels (G), and sum($B^2$) is the sum of the squares of the grayscale values of the blue sub-pixels (B). M is the number of bits of data indicating a grayscale value (e.g., 8), and Resolution is the resolution of the display panel 10.

The on-pixel ratio generator 110 may generate the weighted average picture level WAPL by dividing the sum of the square values of the grayscale values for each sub-pixels by the sum of the grayscale values. The on-pixel ratio generator 110 may generate a weighted average picture level WAPL_R of the red sub-pixels (R), a weighted average picture level WAPL_G of the green sub-pixels (G) and a weighted average picture level WAPL_B of the blue sub-pixels (B) by using Equation 7 below.

$$\text{WAPL\_R} = \text{sum}(R^2)/\text{sum}(R), \text{WAPL\_G} = \text{sum}(G^2)/\text{sum}(G), \text{WAPL\_B} = \text{sum}(B^2)/\text{sum}(B) \quad \text{[Equation 7]}$$

In Equation 7, sum($R^2$) is the sum of the squares of the grayscale values of the red sub-pixels (R), and sum(R) is the sum of the grayscale values of the red sub-pixels (R). sum($G^2$) is the sum of the squares of the grayscale values of the green sub-pixels (G), and sum(G) is the sum of the grayscale values of the green sub-pixels (G). sum($B^2$) is the sum of the squares of the grayscale values of the blue sub-pixels (B), and sum(B) is the sum of the grayscale values of the blue sub-pixels (B).

Figure 5:
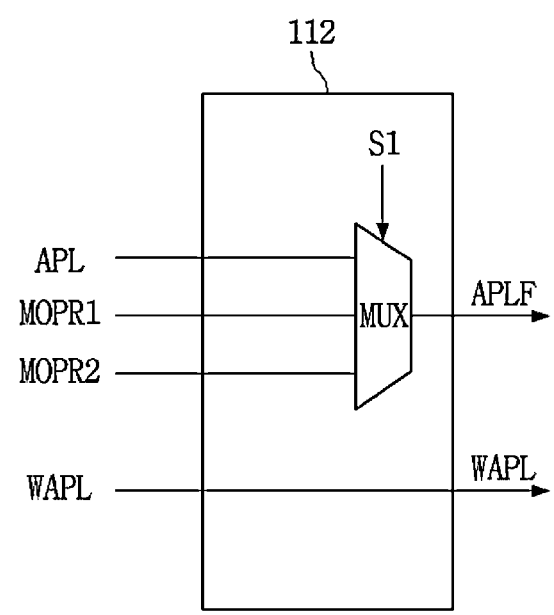
FIG. 5 is a block diagram illustrating the configuration of an image size information provider in accordance with an embodiment.

The on-pixel ratio generator 110 may include an image size information provider 112 to be described in the FIG. 5.

The image size information provider 112 may generate an average picture level factor APLF. In the first mode, the average picture level factor APLF may include at least one of the average picture level APL, the first on-pixel ratio maximum value MOPR1 and the second on-pixel ratio maximum value MOPR2. In the second mode, the average picture level factor APLF may include at least one of among the average picture level value of each of the three sub-pixels (R, G and B) and/or the on-pixel ratio maximum value of each of the three sub-pixels (R, G and B).

The LUT selector 120 may receive the weighted average picture level WAPL and the average picture level factor APLF, and provide selection signal LUTS corresponding to the weighted average picture level WAPL and the average picture level factor APLF to the storage 130. The selection signal LUTS may be understood to include the weighted average picture level WAPL and the average picture level factor APLF.

The storage 130 may store lookup tables LUT including the first weights WT1 corresponding to the on-pixel ratio which is the size of the image. The lookup tables may have first weights WT1 corresponding to a plurality of weighted average picture levels WAPL representing a range of weighted average picture levels WAPL and a plurality of average picture level factors APLF representing a range of average picture level factors APLF. The first weights WT1 may have preset values corresponding to a range of weighted average picture levels WAPL and a range of average picture level factors APLF. The storage 130 may provide the first weight WT1 approximating the weighted average picture levels WAPL and the average picture level factors APLF included in the selection signal LUTS of the LUT selector 120.

In detail, the storage 130 may store a first lookup table LUT1 corresponding to the first mode. And, the storage 130 may store a second lookup table corresponding to the red sub-pixel(R), a third lookup table corresponding to the green sub-pixel(G) and a fourth lookup table corresponding to the blue sub-pixel(B), corresponding to the second mode.

The first lookup table to the fourth lookup table may be stored together in single lookup table LUT or may be separately stored, but the embodiment is not limited thereto.

The weight generator 140 may receive the first weight WT1 of the storage 130 and generate a second weight WT2 corresponding to the weighted average picture levels WAPL and the average picture level factors APLF by using the first weight WT1 approximating the weighted average picture levels WAPL and the average picture level factors APLF. The weight generator 140 may generate the second weight WT2 by using the first weight WT1 for the full screen in the first mode and generate the second weight WT2 by calculating the first weights WT1 for types of a plurality of sub-pixels in the second mode. A detailed method for the weight generator 140 to generate the second weight WT2 will be described later.

The first image data generator 150 may generate the first output image data RGB1 having a luminance corresponding the size of the image on the screen, by applying the second weight WT2 to the image data RGB.

The second image data generator 160 may generate a saturation weight Sa and a first saturation value Y1 for YCbCr color space by using the first output image data RGB1 for RGB color space. The saturation weight Sa may be same as the first saturation value Y1 or be preset values for each of plurality ranges dividing a saturation range. The second image data generator 160 may generate the second output image data RGB2 corresponding to the first output image data RGB1 by applying the saturation weight Sa and the second weight WT2 to the first saturation value Y1. The detailed configuration of the second image data generator 160 will be described later.

Hereinafter, a method for the on-pixel ratio generator 110 to determine the size of the image on the screen will be described in detail with reference to FIG. 4.

Figure 4:
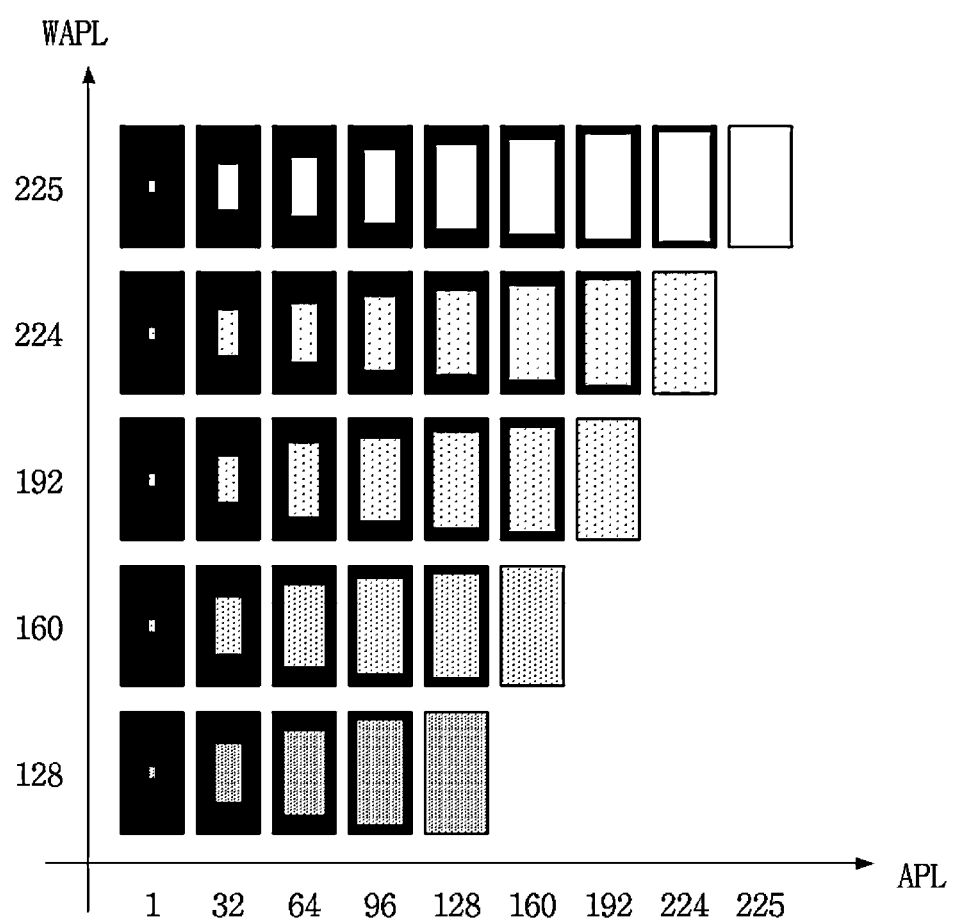
FIG. 4 is a diagram illustrating an image pattern depending on an average picture level factor (APLF) and a weighted average picture level (WAPL).

FIG. 4 is a diagram illustrating an image pattern depending on the average picture level factor (APLF) and the weighted average picture level (WAPL).

Referring to FIG. 4, the value of the average picture level APL may increase as an on-pixel ratio among the plurality of pixels PX on the screen increases. The weighted average picture level WAPL may increase in proportion to a plurality of grayscale values corresponding to at least one light-emitting pixel among the plurality of pixels PX. When arranging the pattern of an image to be displayed with the average picture level APL as the horizontal axis and the weighted average picture level WAPL as the vertical axis, image classification as shown in FIG. 4 may be obtained. The on-pixel ratio generator 110 may determine the size of an image according to the average picture level APL and the weighted average picture level WAPL.

Hereinafter, the image size information provider 112 and the lookup table LUT according to embodiments will be described with reference to FIGS. 5 and 6.

FIG. 5 is a block diagram illustrating the configuration of the image size information provider 112 in accordance with an embodiment.

Figure 6:
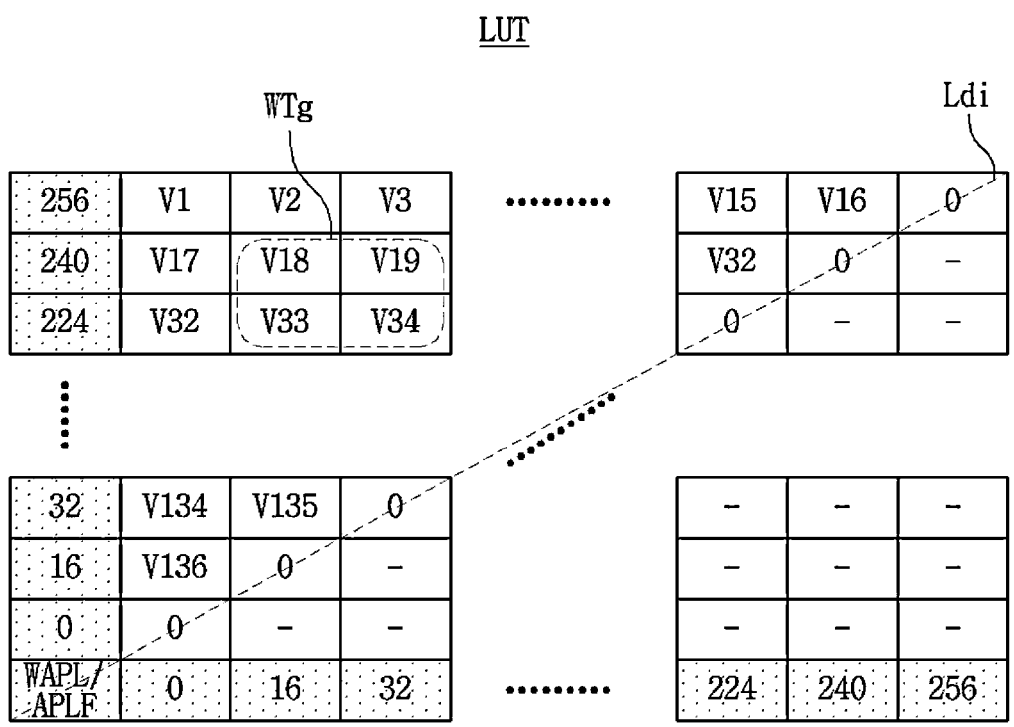
FIG. 6 is a diagram illustrating a lookup table in accordance with an embodiment.

FIG. 6 is a diagram illustrating the lookup table LUT in accordance with an embodiment.

The image size information provider 112 may include a multiplexer MUX, and the multiplexer MUX may select at least one of the average picture level APL, the first on-pixel ratio maximum value MOPR1 and the second on-pixel ratio maximum value MOPR2 according to a selection signal S1. The selection signal S1 may be understood as an option signal provided from an external. In the first mode, the image size information provider 112 may generate the average picture level factor APLF including at least one of the average picture level APL, the first on-pixel ratio maximum value MOPR1 and the second on-pixel ratio maximum value MOPR2. In the second mode, the image size information provider 112 may generate the average picture level factor APLF including the average picture level value of each of the three sub-pixels (R, G and B) and/or the on-pixel ratio maximum value of each of the three sub-pixels (R, G and B). In the second mode, the image size information provider 112 may generate three average picture level factors APLF corresponding to the three sub-pixels (R, G and B), respectively.

The lookup table LUT of the storage 130 may store the first weight WT1 in the form of a two-dimensional table configured by a first axis (the horizontal axis in FIG. 6) and a second axis (the vertical axis in FIG. 6). The first axis may correspond to the average picture level factor APLF, and the second axis may correspond to the weighted average picture level WAPL. In FIG. 6, the lookup table is divided into an upper area and a lower area based on a diagonal line Ldi. The upper area of the lookup table corresponds to the case of high saturation. The lookup table LUT may store the plurality of first weights, for example, 136 first weights, that is, weight V1 to V136, according to the first interval. The diagonal line Ldi and the lower area of the lookup table correspond to the case of low saturation case and the first weight WT1 is not applied. That is, the lookup table may be configured to provide the first weight WT1 approximating the average picture level factor APLF and the weighted average picture level WAPL when the saturation is high. When the weighted average picture level WAPL and the average picture level factor APLF included in the selection signal LUTS of LUT selector 120 match the representative the average picture level factor of the first axis and the representative weighted average picture level of the second axis, the lookup table can provide a weight group WTg, as the first weight WT1, that includes the weight corresponding to the representative the average picture level factor of the first axis and the representative weighted average picture level of the second axis. Also, When the weighted average picture level WAPL and the average picture level factor APLF included in the selection signal LUTS of LUT selector 120 do not match the representative the average picture level factor of the first axis and the representative weighted average picture level of the second axis, the lookup table can provide a weight group WTg, as the first weight WT1, including the first weights WT1 that corresponds the representative average picture level factors on the first axis approximating the average picture level factor APLF of the selection signal LUTS, and the representative weighted average picture levels on the second axis approximating the weighted average picture level WAPL of the selection signal LUTS. In the lookup table LUT, the scale interval of each of the first axis and the second axis may be set to a power of 2. When the scale interval is a power of 2, a circuit may be simplified by replacing division with bit shifting in bilinear interpolation.

Hereinafter, the weight generator 140 in accordance with an embodiment will be described in detail with reference to FIGS. 7 to 9.

Figure 7:
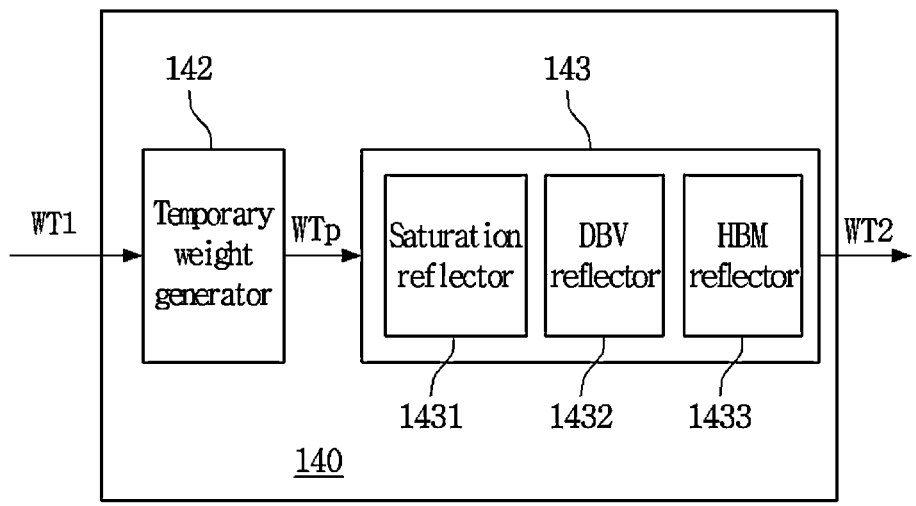
FIG. 7 is a block diagram illustrating the configuration of a weight generator in accordance with an embodiment.

FIG. 7 is a block diagram illustrating the configuration of a weight generator in accordance with an embodiment.

Figure 8:
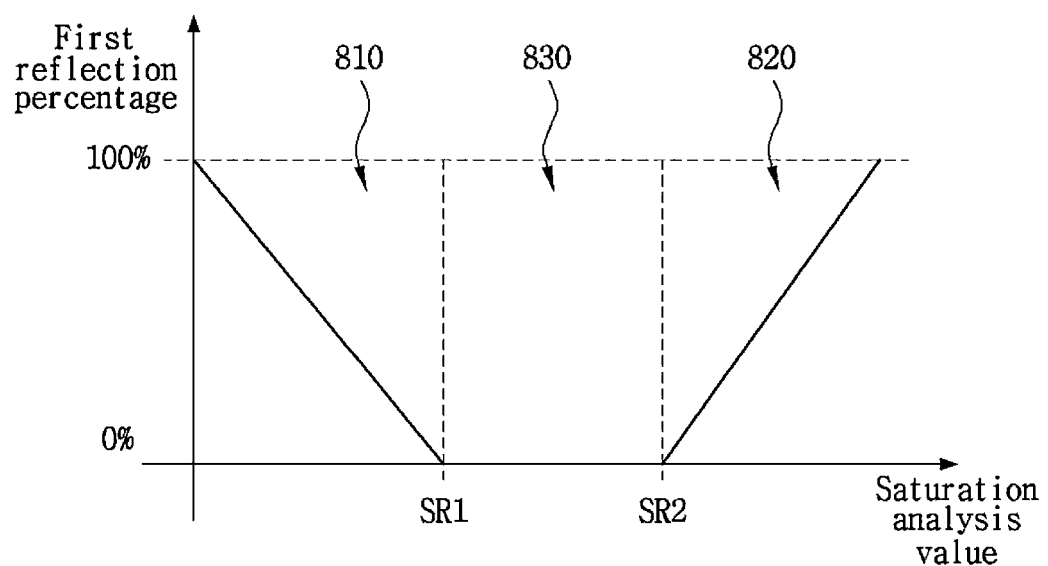
FIG. 8 is an exemplary diagram of a first reflection percentage curve depending on a saturation analysis value.

FIG. 8 is an exemplary diagram of a first reflection percentage curve depending on a saturation analysis value.

Figure 9:
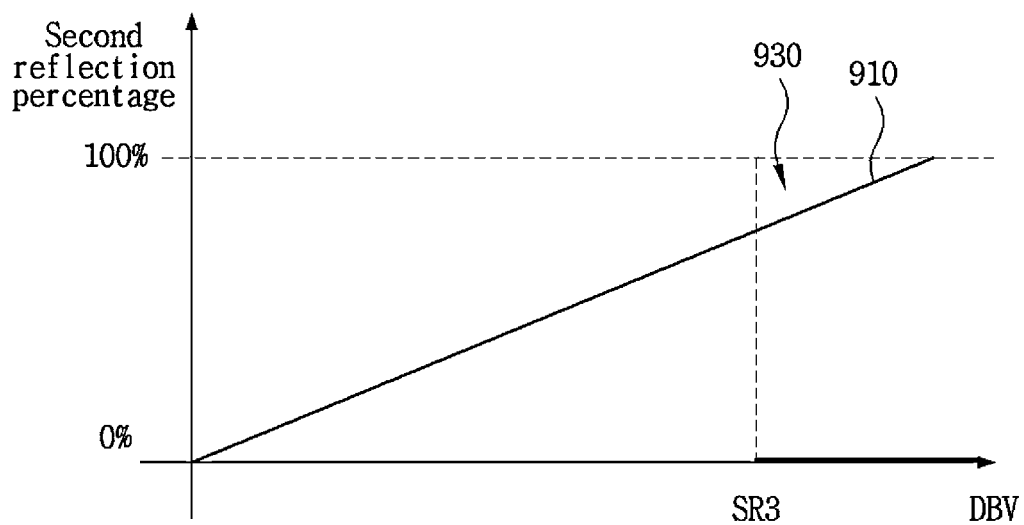
FIG. 9 is an exemplary diagram of a second reflection percentage curve depending on a DBV (display brightness value).

FIG. 9 is an exemplary diagram of a second reflection percentage curve depending on a DBV (display brightness value).

Referring to FIGS. 6 and 7, the weight generator 140 may include a temporary weight generator 142 and a weight reflector 143.

For example, when the average picture level factor APLF corresponding to a preset image size is 18 and the weighted average picture level WAPL corresponding to the preset image size is 230, the lookup table of the storage 130 may provide a weight group WTg, as the first weight WT1, approximating coordinates (18, 230) according to the average picture level factor APLF and the weighted average picture level WAPL. The weight group WTg may include four first weights V18, V19, V33 and V34 approximating the coordinates (18, 230).

The temporary weight generator 142 may calculate a temporary weight WTp by applying the bilinear interpolation to first weights V18, V19, V33 and V34 included in the weight group WTg. The temporary weight WTp may be understood to correspond to the average picture level factor APLF and the weighted average picture level WAPL of the on-pixel ratio information. When the function of the weight reflector 143 is disabled, the weight generator 140 may output the temporary weight WTp as the second weight WT2.

When the function of the weight reflector 143 is enabled, the weight reflector 143 may generator the second weight WT2 by using the temporary weight WTp. The weight reflector 143 may include a saturation reflector 1431, a DBV reflector 1432 and an HBM reflector 1433.

The saturation reflector 1431 may generate a saturation value by using the image data RGB. The saturation reflector 1431 may calculate a first reflection percentage indicating a degree to which the temporary weight WTp is reflected, according to the calculated saturation value (hereinafter, referred to as a first reflection percentage). For example, when the saturation is high, the saturation reflector 1431 may calculate the first reflection percentage to be high. When the saturation is close to an achromatic color, the saturation reflector 1431 may calculate the first reflection percentage to be low. The saturation reflector 1431 may calculate a saturation analysis value, and may calculate the first reflection percentage by substituting the saturation analysis value into a saturation reflection percentage curve stored in advance. The saturation reflector 1431 may calculate a grayscale value difference between a sub-pixel whose grayscale value is largest and a sub-pixel whose grayscale value is smallest, for each of the plurality of pixels PX. The saturation reflector 1431 may calculate a sum value by summing grayscale value differences for all the pixels PX, and may calculate the saturation analysis value by dividing the sum value by the number of pixels having the achromatic color among all the pixels PX. The saturation reflector 1431 may determine a pixel in which the grayscale values of the sub-pixels are all the same, as an achromatic pixel, and may determine a pixel in which at least one sub-pixel has a grayscale value different from that of another sub-pixel, as a chromatic pixel.

For example, referring to FIG. 8, a curve may be set such that the first reflection percentage has a value of 0 or more in a low saturation region 810 and a high saturation region 820 and is 0% in a middle saturation region 830. According to this curve, the saturation reflector 1431 may apply a saturation weight only in the low saturation region 810 and the high saturation region 820, and may not apply the saturation weight in the middle saturation region 830. A first setting value SR1 indicating the low saturation region 810 and a second setting value SR2 indicating the high saturation region 820 may be set as register values. The saturation reflector 1431 may calculate the first reflection percentage in the low saturation region 810 and the high saturation region 820 by using the bilinear interpolation. When the saturation reflector 1431 calculates the first reflection percentage by using the bilinear interpolation, in order to use bit shifting instead of division, the first setting value SR1 and the second setting value SR2 may have values corresponding to powers of 2.

The DBV reflector 1432 may calculate a second reflection percentage indicating a degree to which the temporary weight WTp is applied in correspondence to the DBV determined according to the image data RGB of a user or an external host (hereinafter, referred to as a second reflection percentage). The DBV reflector 1432 may calculate the second reflection percentage to be high as the DBV is high.

For example, referring to FIG. 9, a curve 910 may have a pattern in which the second reflection percentage increases as the DBV increases. According to the curve 910, the DBV reflector 1432 may increase the second weight as the DBV is high, and may decrease the second weight as the DBV is low.

In an HBM (high brightness mode) screen mode, the HBM reflector 1433 turns off a voltage drop compensation function in an HBM band region in order to allow an image to be outputted to the screen as it is bright when it is bright. For example, as shown in FIG. 9, the HBM reflector 1433 may set a region 930 in which the DBV is equal to or greater than a third setting value SR3, as an HBM region. The HBM reflector 1433 may control the second reflection percentage to 0% in the region 930. Accordingly, in the region 930, the function of the weight reflector 143 may be disabled, and the temporary weight generator 142 may generate the temporary weight WTp as the second weight WT2.

Hereinafter, the second image data generator 160 in accordance with an embodiment will be described in detail with reference to FIG. 10.

Figure 10:
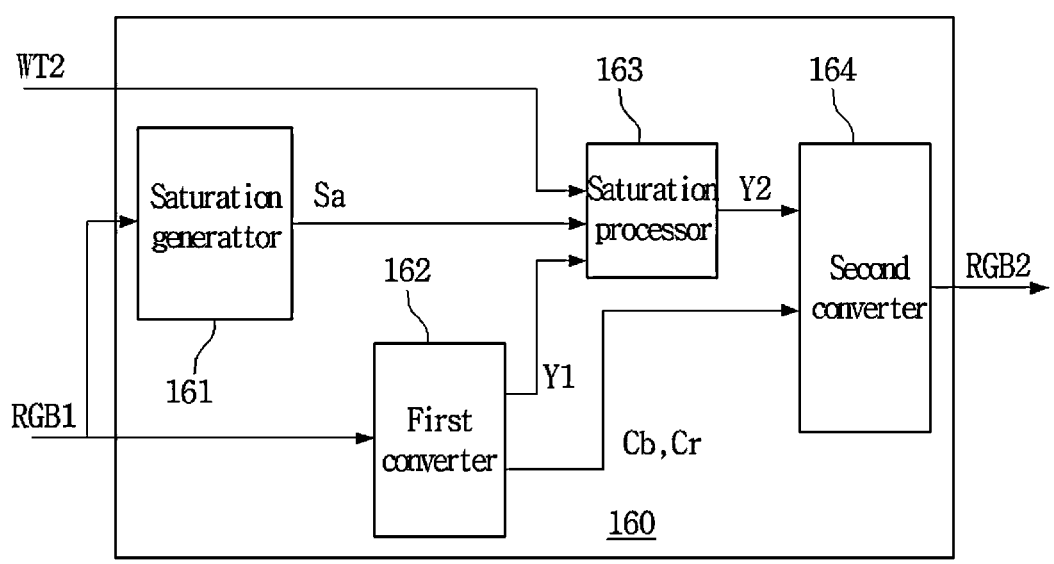
FIG. 10 is a block diagram illustrating the configuration of a second image data generator in accordance with an embodiment.

FIG. 10 is a block diagram illustrating the configuration of a second image data generator 160 in accordance with an embodiment.

Referring to FIG. 10, the second image data generator 160 includes a saturation generator 161, a first converter 162, a saturation processor 163 and a second converter 164.

The saturation generator 161 may generate the saturation weight Sa of the YCbCr color space by using the first output image data RGB1.

The first converter 162 may convert the first output image data RGB1 of the RGB color space into the first converted image data Y1CbCr of the YCbCr color space.

The saturation processor 163 may output a second saturation value Y2 by controlling the degree to which the second weight WT2 is applied to the first saturation value Y1 of the first converted image data Y1CbCr. That is to say, when the saturation weight Sa is low, the saturation processor 163 may not apply the second weight WT2 into the first saturation value Y1. When the saturation weight Sa is high, the saturation processor 163 may generate the second saturation value Y2 by applying the second weight WT2 into the first saturation value Y1 such that the first saturation value Y1 decreases in proportion to the saturation weight Sa.

For example, when the saturation weight Sa is less than a preset reference value, the saturation processor 163 may not apply the second weight WT2 into the first saturation value Y1, and may output the first saturation value Y1 as the second saturation value Y2. When the saturation weight Sa is above the preset reference value, the saturation processor 163 may generate the second saturation value Y2 by applying the second weight WT in inverse proportion to the saturation weight Sa into the first saturation value Y1. The saturation processor 163 may generate the second saturation value Y2 by decreasing the first saturation value Y1 so that the sum of the luminances of the red sub-pixels (R), the luminances of the green sub-pixels (G) and the luminances of the blue sub-pixels (B) is the same as the luminance of the white. In other words, the saturation processor 163 may generate the second saturation value Y2 such that the sum of the luminance R of the red sub-pixel (R), the luminance G of the green sub-pixel (G) and the luminance B of the blue sub-pixel (B) has the relationship of R+G+B=W. Here, W is the luminance of the white in the image.

The second converter 164 may generate the second converted image data Y2CbCr by using the second saturation value Y2 and a Cb value and a Cr value which are chrominance components of the first converted image data Y1CbCr. The second converter 164 may convert the second converted image data Y2CbCr of the YCbCr color space into the second output image data RGB2 of the RGB color space.

As is apparent from the above description, according to the embodiments, by minimizing a variation in the brightness of a pixel, it is possible to improve image quality. Further, according to the embodiments, it is possible to minimize a variation in the brightness of a pixel even in a variation in an image size or the number of pixels emitting light.

What is claimed is:

1. A display apparatus comprising a timing controller converting image data inputted from an external into output image data,
wherein the timing controller configured to:
generating an on-pixel ratio information corresponding to a size of image on a screen by using the image data;
selecting a first weight approximating the on-pixel ratio information in a lookup table having weights for compensation according to the size of the image on the screen;
generating a second weight corresponding to the on-pixel ratio information by converting the first weight;
converting the image data into first output image data by using the second weight;
converting the first output image data into second output data image by controlling a degree to which the second weight is applied to a saturation value corresponding to the first output image data according to a saturation weight corresponding to the first output image data; and
outputting the second output image data as the output image data,
wherein the timing controller configured to include an on-pixel ratio generator which generates the on-pixel ratio information including an average picture level factor and a weighted average picture level for the screen and each of color by using the image data, and
wherein the on-pixel ratio generator configured to:
generate the average picture level factor for sub-pixels corresponding to each of colors; and
generate the weighted average picture level by dividing the sum of the square values of the grayscale values for sub-pixels corresponding to each of colors by the sum of the grayscale values.

2. The display apparatus according to claim 1,
wherein the timing controller selects the first weight approximating the average picture level factor and the weighted average picture level among the weights of the lookup table.

3. The display apparatus according to claim 2,
wherein the lookup table includes first lookup table saving the first weight for the screen and second lookup table saving the first weight for the each of the color; and
wherein the timing controller includes a weight generator which generates the second weight by converting the first weight selected in the first lookup table and the second lookup table.

4. The display apparatus according to claim 3,
wherein the on-pixel ratio generator configured to:
generate an average picture level by weighted averaging grayscale values of pixels of the screen,
generate first on-pixel ratio maximum value as first maximum value among average grayscale values of sub-pixels corresponding to each of colors of the screen;
generate second on-pixel ratio maximum value by dividing second maximum value among square values of the average grayscale values of sub-pixels corresponding to each of colors of the screen by resolution of the screen;
generate the average picture level factor including at least one of the average picture level, the first on-pixel ratio maximum value and the second on-pixel ratio maximum value; and generate the weighted average picture level by dividing the second maximum value by the first maximum value.

5. The display apparatus according to claim 1, wherein the timing controller includes a weight generator which generates the second weight corresponding to the on-pixel ratio information by interpolating weights included in the first weight corresponding to the screen and sub-pixels of each of colors.

6. The display apparatus according to claim 5, wherein the weight generator further configured to:
generates the second weight by reflecting at least one of a saturation value corresponding to the image data, a DBV and a high brightness mode.

7. The display apparatus according to claim 1, wherein the timing controller includes an image data generator which converts the first output image data into the second output image data, and
wherein the image data generator configured to:
generate a saturation weight of YCbCr color space corresponding to the first output image data of RGB color space;
generate first saturation value of first converted image data of the YCbCr color space corresponding to the first output image data of the RGB color space;
generate second saturation value by controlling the degree to which the second weight is applied to the first saturation value; and
generate second converted image data of the YCbCr color space including the second saturation value.

8. The display apparatus according to claim 7, wherein the image data generator generates the first saturation value as the second saturation value when the saturation weight is less than a preset reference value.

9. The display apparatus according to claim 7, wherein the image data generator generates the second saturation value by applying the second weight into the first saturation value when the saturation weight is above a preset reference value.

10. A timing controller of a display apparatus comprising:
an on-pixel ratio generator configured to receive image data inputted from an external and generating an on-pixel ratio information corresponding to a size of image on a screen by using the image data;
a storage configured to store a lookup table having weights for compensation according to the size of the image on the screen;
a weight generator configured to receive a first weight approximating the on-pixel ratio information among the weights of the lookup table and generate a second weight corresponding to the on-pixel ratio information by converting the first weight;
a first image data generator configured to convert the image data into first output image data by using the second weight; and
a second image data generator configured to convert the first output image data into second output image data by controlling a degree to which the second weight is applied to a saturation value corresponding to the first output image data according to a saturation weight corresponding to the first output image data, and output the second output image data as an output image data, wherein the on-pixel ratio generator configured to:
generates the on-pixel ratio information including an average picture level factor and a weighted average picture level for the screen and each of color by using the image data;
generate the average picture level factor for sub-pixels corresponding to each of colors; and
generate the weighted average picture level by dividing the sum of the square values of the grayscale values for sub-pixels corresponding to each of colors by the sum of the grayscale values.

11. The timing controller of a display apparatus according to claim 10, wherein the storage configured to provide the first weight approximating the average picture level factor and the weighted average picture level among the weights of the lookup table.

12. The timing controller of a display apparatus according to claim 11, wherein the lookup table includes first lookup table saving the first weight for the screen and second lookup table saving the first weight for the each of the color; and
wherein the weight generator which generates the second weight by converting the first weight selected in the first lookup table and the second lookup table.

13. The timing controller of a display apparatus according to claim 12, wherein the on-pixel ratio generator configured to:
generate an average picture level by weighted averaging grayscale values of pixels of the screen,
generate first on-pixel ratio maximum value as first maximum value among average grayscale values of sub-pixels corresponding to each of colors of the screen;
generate second on-pixel ratio maximum value by dividing second maximum value among square values of the average grayscale values of sub-pixels corresponding to each of colors of the screen by resolution of the screen;
generate the average picture level factor including at least one of the average picture level, the first on-pixel ratio maximum value and the second on-pixel ratio maximum value; and
generate the weighted average picture level by dividing the second maximum value by the first maximum value.

14. The timing controller of a display apparatus according to claim 10, wherein the weight generator generates the second weight corresponding to the on-pixel ratio information by interpolating weights included in the first weight corresponding to the screen and sub-pixels of each of colors.

15. The timing controller of a display apparatus according to claim 14, wherein the weight generator further configured to:
generates the second weight by reflecting at least one of a saturation value corresponding to the image data, a DBV and a high brightness mode.

16. The timing controller of a display apparatus according to claim 10, wherein the second image data generator comprising:
a saturation generator configured to generate a saturation weight of YCbCr color space corresponding to the first output image data of RGB color space;
a first converter configured to generate first saturation value of first converted image data of the YCbCr color space corresponding to the first output image data of the RGB color space;

a saturation processor configured to generate second saturation value by controlling the degree to which the second weight is applied to the first saturation value; and a second converter configured to generate second converted image data of the YCbCr color space including the second saturation value.

17. The timing controller of a display apparatus according to claim 16, wherein the saturation processor generates the first saturation value as the second saturation value when the saturation weight is less than a preset reference value.

18. The timing controller of a display apparatus according to claim 16, wherein the saturation processor generates the second saturation value by applying the second weight into the first saturation value when the saturation weight is above a preset reference value.

* * * * *